United States Patent
Liebold

(10) Patent No.: US 12,330,468 B2
(45) Date of Patent: Jun. 17, 2025

(54) DAMPING SYSTEM FOR A WHEEL OF A MOTOR VEHICLE

(71) Applicant: Dr. Ing. h.c. F. Porsche Aktiengesellschaft, Stuttgart (DE)

(72) Inventor: Jochen Liebold, Stuttgart (DE)

(73) Assignee: Dr. Ing. h. c. F. Porsche Aktiengesellschaft (DE)

( * ) Notice: Subject to any disclaimer, the term of this patent is extended or adjusted under 35 U.S.C. 154(b) by 0 days.

(21) Appl. No.: 18/637,501

(22) Filed: Apr. 17, 2024

(65) Prior Publication Data
US 2024/0416708 A1 Dec. 19, 2024

(30) Foreign Application Priority Data

Jun. 13, 2023 (DE) ...................... 10 2023 115 400.1

(51) Int. Cl.
*B60G 17/08* (2006.01)
*B60G 13/08* (2006.01)
(Continued)

(52) U.S. Cl.
CPC ............. *B60G 17/08* (2013.01); *B60G 13/08* (2013.01); *B60G 17/0152* (2013.01);
(Continued)

(58) Field of Classification Search
CPC .... B60G 17/08; B60G 13/08; B60G 17/0152; B60G 17/0165; B60G 2202/24;
(Continued)

(56) References Cited

U.S. PATENT DOCUMENTS 6,073,736 A * 6/2000 Franklin ................ B62K 25/06
188/282.4

FOREIGN PATENT DOCUMENTS

DE    3904922 A1    9/1989
DE    69731324 T2   12/2004
(Continued)

OTHER PUBLICATIONS

DE102017117658A1 Machine English Translation (Year: 2019).*
German Search Report mailed Dec. 5, 2023, for corresponding Application No. DE102023115400.1. (4 pages).

*Primary Examiner* — Jason D Shanske
*Assistant Examiner* — Matthew James O'Neill
(74) *Attorney, Agent, or Firm* — Buchanan Ingersoll & Rooney PC

(57) ABSTRACT

A damping system of an active chassis for one wheel of a motor vehicle. The system includes a double-acting hydraulic cylinder and a damper having a piston, which damper is couplable to a wheel suspension system for the wheel. The system also includes a hydraulic pump, and a hydraulic unit having a hydraulic reservoir and valves. The hydraulic pump and the hydraulic unit cooperate with hydraulic chambers of the hydraulic cylinder such that, depending on the direction of conveyance of the hydraulic pump, a movement of the piston in a first direction of actuation or in a second direction of actuation can be provided. The damper includes the hydraulic cylinder and the piston is designed such that, in the region of the damper, a flow of hydraulic oil via the piston or along the piston of the damper is at most 3 L/min.

10 Claims, 1 Drawing Sheet

(51) Int. Cl.
*B60G 17/015* (2006.01)
*B60G 17/0165* (2006.01)

(52) U.S. Cl.
CPC ...... *B60G 17/0165* (2013.01); *B60G 2202/24* (2013.01); *B60G 2204/62* (2013.01); *B60G 2206/41* (2013.01); *B60G 2500/114* (2013.01); *B60G 2600/182* (2013.01); *B60G 2800/162* (2013.01); *B60G 2800/916* (2013.01)

(58) Field of Classification Search
CPC ............ B60G 2204/62; B60G 2206/41; B60G 2500/114; B60G 2600/182; B60G 2800/162; B60G 2800/916
See application file for complete search history.

(56) References Cited

FOREIGN PATENT DOCUMENTS

| | | | |
|---|---|---|---|
| DE | 69731423 T2 | 10/2005 | |
| DE | 102010047955 A1 | 7/2011 | |
| DE | 102017112727 A1 | 12/2018 | |
| DE | 102017117658 A1 * | 2/2019 | ........... B60G 11/265 |
| DE | 102017117658 B4 | 6/2021 | |
| DE | 102019115492 B4 | 8/2022 | |

* cited by examiner

DAMPING SYSTEM FOR A WHEEL OF A MOTOR VEHICLE

CROSS-REFERENCE TO RELATED APPLICATION

This application claims priority to German Patent Application No. 10 2023 115 400.1, filed Jun. 13, 2023, the content of such application being incorporated by reference herein in its entirety.

FIELD OF THE INVENTION

The invention relates to a damping system of an active chassis for one wheel of a motor vehicle. The invention also relates to a motor vehicle comprising such a damping system.

BACKGROUND OF THE INVENTION

DE 10 2019 115 492 B4, which is incorporated by reference herein, discloses a damping system of an active chassis for one wheel of a motor vehicle, which system comprises a damper, a hydraulic pump driven by an electric motor, a hydraulic reservoir, as well as multiple valves. The damper is formed from a double-acting hydraulic cylinder and a piston movable in a reciprocating manner within said cylinder. The hydraulic pump is coupled to hydraulic chambers of the hydraulic piston via hydraulic lines, wherein a movement of the piston in a first actuation direction or in a second actuation direction can be provided depending on the conveying direction of the hydraulic pump. The valves are check valves as well as control valves designed as controllable choke valves.

Such an active chassis damping system is subjected to highly dynamic loads while traveling. The same is intended to have both advantageous dynamic properties in terms of providing a high force gradient and advantageous acoustic properties in terms of low noise levels.

DE 10 2017 112 727 A1, DE 10 2010 047 955 A1, DE 697 31 423 T2 and DE 10 2017 117 658 B4, which are each incorporated by reference herein, disclose further details of damping systems of active chassis of motor vehicles.

SUMMARY OF THE INVENTION

Described herein is a damping system which has both advantageous dynamic properties and advantageous acoustical properties.

The damping system according to aspects of the invention comprises a damper comprising a double-acting hydraulic cylinder and a piston, wherein the damper is couplable to a wheel suspension system for the wheel. The damping system according to aspects of the present invention further comprises a hydraulic pump and a hydraulic unit having a hydraulic reservoir and valves. The hydraulic pump and the hydraulic unit cooperate with hydraulic chambers of the hydraulic cylinder such that, depending on the direction of conveyance of the hydraulic pump, movement of the piston in a first direction of actuation or in a second direction of actuation can be provided. In the damping system according to aspects of the invention, the damper comprising the hydraulic cylinder and the piston is designed such that, in the region of the damper, a flow of hydraulic oil via the piston or along the piston of the damper, and thus directly between the hydraulic chambers separated by pistons, is at most 3 L/min. With the present invention, it is proposed for the first time to design the damper comprising the hydraulic cylinder and the piston such that flow from the one hydraulic chamber into the other hydraulic chamber of the hydraulic cylinder, which can also be considered leakage flow, is a maximum of 3 liters (L) per minute (min). It is thus possible provide an advantageous force gradient of a force-speed characteristic curve of the damper. The damping system features both advantageous dynamic properties and advantageous acoustic properties.

Preferably, the damper comprising the hydraulic cylinder and the piston is designed such that a slope of a force-speed characteristic curve of the damper is between 50,000 and 250,000 N-s/m given non-operational pressure relief. This force gradient of the damper force-speed characteristic curve is particularly preferred in order to ensure both advantageous dynamic properties and advantageous acoustic properties of the damper, and thus the damping system.

The damper preferably comprises at least one orifice, the cross-section of which is sized such that the flow of hydraulic oil across the piston or along the same in both directions of operation of the piston of the damper is at most 3 L/min and the slope of a force-speed characteristic curve of the damper is preferably between 50,000 and 250,000 N-s/m given non-operational pressure relief.

In particular, at least one orifice is a controllable orifice whose cross section is adjustable for controlling the flow of hydraulic oil via the piston or along the same.

As previously explained hereinabove, the flow of the hydraulic oil via or along the piston from the one hydraulic chamber to the other hydraulic chamber can be considered a leakage flow. Such a leakage flow can be both an intentional or wanted or unintentional or unwanted leakage flow. An unwanted or unintentional leakage flow occurs via leakage points, which results as a result of tolerances produced. A wanted or intentional leakage can be provided via the at least one orifice. By sizing the at least one orifice, both the flow of hydraulic oil over and along the piston can be limited to 3 L/min and the force gradient of between 50,000 and 250,000 N-s/m can be provided. This enables both good dynamic and good acoustic properties in a particularly advantageous manner.

The hydraulic unit preferably comprises a control valve with pressure relief for each actuation direction of the piston, wherein the pressure relief is designed such that, if an amount of the speed of the piston of the damper is less than a defined limit, the pressure relief is not operational and that then, if the amount of the speed of the piston of the damper is greater than the defined limit, then the pressure relief is operational. Again, this serves to provide advantageous dynamic and acoustic characteristics of the damping system.

In particular, the pressure relief is designed such that, given operational pressure relief, the slope of the force-speed characteristic curve of the damper is at most 2,500 N-s/m and/or, given a closed control valve, the force of the damper is at least 6,000 N, and/or the defined limit value for the damper speed is between 0.02 and 0.14 m/s. Via one or more of these design criteria, it is possible to further improve the dynamic properties and acoustic properties of the damping system.

BRIEF DESCRIPTION OF THE DRAWINGS

Without being restricted thereto, embodiment examples of the invention are explained in greater detail with reference to the drawings.

DETAILED DESCRIPTION OF THE INVENTION

Figure 1:
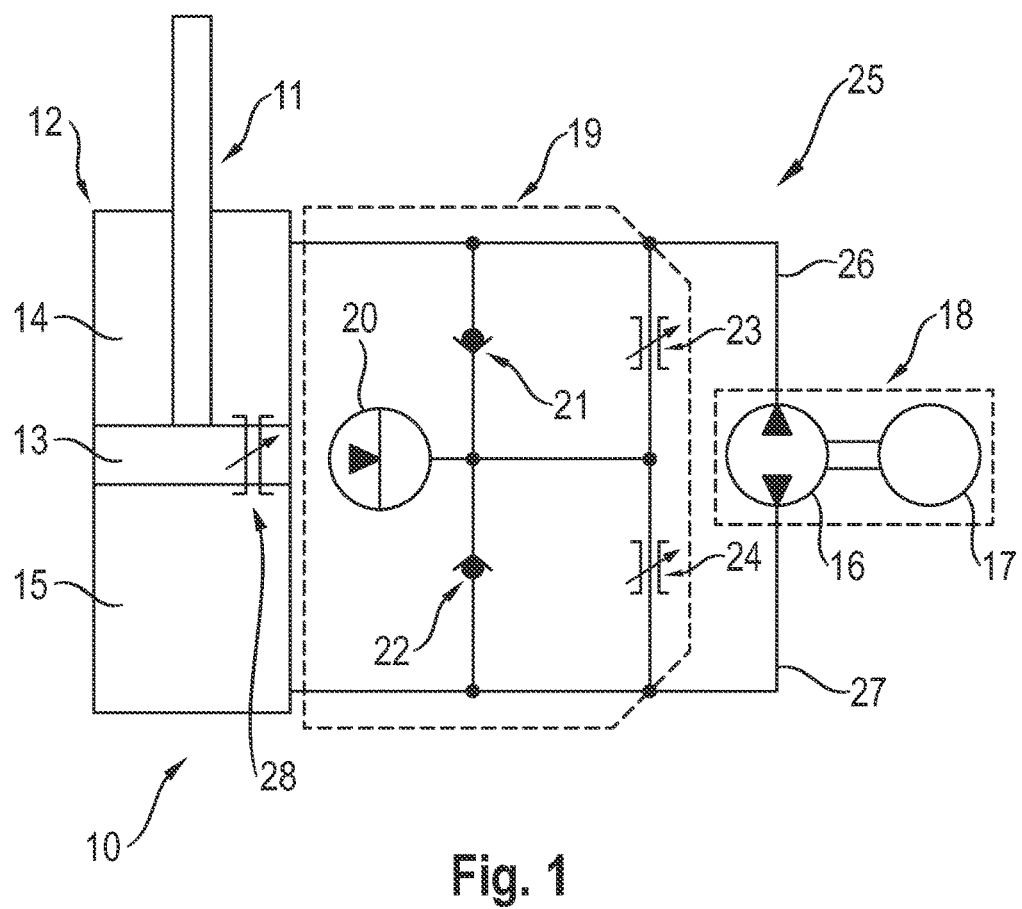
FIG. 1 depicts a schematic representation of a damping system of an active chassis of a motor vehicle for a wheel of the motor vehicle.

FIG. 1 shows a highly schematized damping system 10 of an active chassis according to aspects of the invention for a wheel of a motor vehicle.

The damping system 10 comprises a damper 11 which is couplable to a wheel suspension system (not shown) for the wheel (not shown). The damper 11 is formed by a double-acting hydraulic cylinder 12 and a piston 13, whereby the piston 13 reciprocates back and forth in the hydraulic cylinder 12 (up and down in FIG. 1).

The hydraulic cylinder 12 designed as a double-acting hydraulic cylinder comprises a hydraulic chamber 14, 15 on each side of the piston 13, which chamber separates the pistons (13) from one another. Depending on which of the two hydraulic chambers 14, 15 are being supplied with hydraulic oil and which of the two hydraulic chambers 15, 14 hydraulic oil is being discharged from, the piston 13 can be displaced in either a first actuation direction or an opposing second actuation direction. It is assumed hereinafter that the first actuation direction of the piston 13 is a rebound direction actuation, and the second actuation direction of the piston 13 is a compression direction actuation.

The damping system 10 further comprises a hydraulic pump 16 that is drivable by an electric motor 17. The hydraulic pump 16 and the electric motor 17 form a pump-motor unit 18. The hydraulic pump 16 is a reversing pump that can be driven in different rotational directions in order to provide different conveying directions.

The damping system 10 in FIG. 1 further comprises a hydraulic unit 19 having a hydraulic reservoir 20 as well as valves 21, 22, 23, 24. Valves 21, 22 are check valves, and valves 23, 24 are control valves, i.e., controllable damping valves or choke valves. Such control valves 23, 24 feature pressure relief. The hydraulic reservoir 20 in each case engages between the check valves 21, 22 and between the control valves 23, 24 on tube lines of the hydraulic unit 19, which are coupled to the hydraulic chambers 14, 15 of the hydraulic cylinder 12.

Depending on the conveying direction of the hydraulic pump 16 and preferably also depending on the position of the valves 21, 22, 23, 24 of the hydraulic unit 19, in order to move the piston 13 in the first direction of movement, i.e., in the rebound direction, oil is supplied to the hydraulic chamber 14 and oil is removed from the hydraulic chamber 15. Or, in order to provide a second direction of movement of the piston 13 in the second direction of movement, i.e., the compression direction, oil is supplied to the hydraulic chamber 15 and oil is removed from the hydraulic chamber 14.

The hydraulic pump 16 of the pump-motor unit 18 is connected to the hydraulic unit 19 comprising the hydraulic reservoir 20 and the valves 21, 22, 23, 24, which unit is preferably installed as a unit on the damper 11, or installed on or integrated into the hydraulic cylinder 12 via a tube-hose system 25. Thus, starting from the hydraulic pump 16, connecting lines 26, 27 extend towards the hydraulic cylinder 12. The hydraulic pump 16 is coupled to respective connections of the hydraulic unit 19 for the hydraulic pump 16 via a respective connection line 26, 27 and coupled to one of the two respective hydraulic chambers 13, 14 of the hydraulic cylinder 12 via the hydraulic unit 19, i.e., the tube lines of the hydraulic unit 19.

The damper 11 of the damping system 10 comprising the hydraulic cylinder 12 and the piston 13 is designed such that in the region of the damper 11 a flow of hydraulic oil via the piston 13 or along the piston 13 between the hydraulic chambers 14, 15 is at most 3 L/min in both directions of operation of the piston 13. This flow across the piston 13 or along the same, which is a maximum of 3 L/min, can also be considered a leakage flow and can be comprised of a production-related leakage or a tolerance-bearing leakage as well as a deliberately provided leakage.

In the preferred embodiment example shown, the damper 11 comprises at least one orifice 28. The flow cross-section of the orifice 28 is sized such that the total flow of hydraulic oil across the piston 13 or along the piston 13 between the hydraulic chambers 14, 15 in both directions of operation of the piston 13 of the damper 11 is at most 3 L/min.

In the embodiment example shown, the orifice 28 is a controllable orifice. Instead of a controllable orifice 28, a fixed and thus non-controllable orifice 28 can also be used.

It is possible to provide an individual, preferably controllable, orifice 28 for each actuation direction of the piston 13.

The hydraulic pump 16 of the motor-pump unit 18 is designed such that in both directions of actuation of the piston 13 and thus in both conveyance directions of the hydraulic pump 16, a leakage flow in the region of the hydraulic pump 16 is at most 2 L/min.

The damper 11 comprising the hydraulic cylinder 12 and the piston 13 is designed such that a slope of a force-speed characteristic curve 29, 29' of the damper 11 is between 50,000 and 250,000 N-s/m given non-operational pressure relief. Given operational pressure relief, the slope of the force-speed characteristic curve 29, 29' is a maximum of 2,500 N-s/m.

As previously explained, the hydraulic unit 19 comprises check valves 21, 22 as well as control valves 23, 24. The control valves 23, 24 feature a pressure relief in order to limit the piston force of the piston 13 of the damper 11, wherein this pressure relief can be provided by a spring element configured to close the respective operational control valve 23, 24, and which, when the pressure relief is operational, opens the respective control valve 23, 24.

As previously explained, given non-operational pressure relief in both directions of operation of the piston 13 of the damper 11, the slope of the force-speed characteristic curve 29, 29' of the damper 11 is between 50,000 and 250,000 N-s/m, whereas, this slope is a maximum of 2,500 N-s/m given operational pressure relief.

Figure 2:
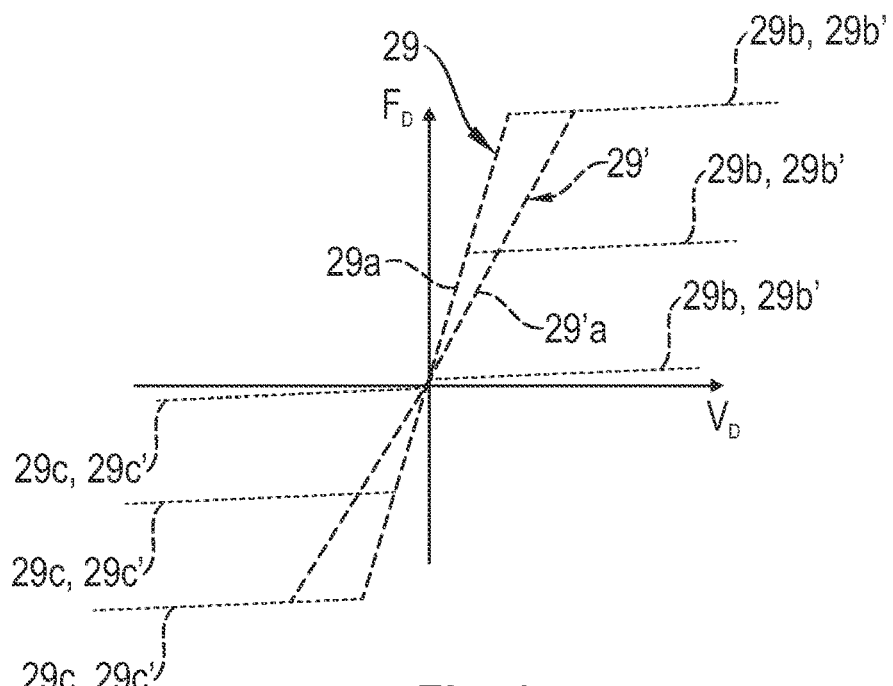
FIG. 2 depicts a force-speed characteristic curve of the damper of a damping system according to aspects of the invention.

FIG. 2 shows two possible force-speed characteristic curves of damper 11, wherein the piston force $F_D$ of piston 13 of the damper 11 is discharged above the speed VD of the piston 13.

If the damper 11 comprises a fixed aperture 28, then the slope of the force-speed characteristic curve of the damper 11 is fixed or non-changeable given non-operational pressure relief on the control valves 23, 24. Given a controllable aperture 28, on the other hand, by changing the opening thereof, the slope of the force-speed characteristic curve of the damper 11 can be changed given non-operational pressure relief. If a controllable aperture 28 is provided, then characteristic curve 29 and characteristic curve 29' (as well as vice versa, characteristic curve 29' and characteristic curve 29) can be transferred by changing the opening of the controllable aperture 28.

In FIG. 2, sections 29, 29' and regions 29a, 29a', 29b, 29b' and 29c, 29c', wherein the regions 29a, 29a' show the slope of the force-speed characteristic curve 29, 29' for both directions of operation of the piston 13 given non-operational pressure relief.

Regions 29b, 29b' illustrate the slope of the force-speed characteristic curve given operational pressure relief on the control valves 23, 24 for a first direction of actuation. Regions 29c, 29c' illustrate the slope of the force-speed characteristic curve given operational pressure relief in a second actuation direction of piston 13.

The pressure relief on control valves 23, 24 is designed such that, if an amount of the speed $V_D$ of damper 11 is less than a defined limit value, then the pressure relief is not operational, whereas, if the amount of the speed $V_D$ of damper 11 is greater than the defined limit value, then the pressure relief is operational.

In the range of this speed limit, a transition is thus made from the range 29a, 29a' to the respective range 29b, 29b' or 29c, 29c' of the force-speed characteristic curve, i.e., depending on the actuation direction of the piston 13. This defined limit value for the speed of the damper 11 is between 0.02 and 0.14 m/s, in particular between 0.03 and 0.09 m/s.

The force $F_D$ of the damper 11, which provides the same with the closed control valve 23 or 24 in the respective actuation direction of the piston 13, is at least 6,000 N. The force of the damper 11 is controllable via an electrical current supply of the respective control valve 23, 24, i.e., in a range between 50 N and 6,000 N.

Accordingly, a flow of hydraulic oil between the hydraulic chambers 14, 15 of a maximum of 3 L/min is permitted via the piston 13 of the damper 11 or along the piston 13. Leakage in the region of the hydraulic pump 16 is a maximum of 2 L/min. It is possible that, given non-operational pressure relief in the range of control valves 23, 24, a slope $dF_D/dV_D$ of the force-speed characteristic curve between 50,000 and 250,000 N-s/m can be provided.

The flow of hydraulic oil between hydraulic chambers 14, 15 of a maximum of 3 L/min and the slope $dF_D/dV_D$ of the force-speed characteristic curve between 50,000 and 250,000 N-s/m are preferably provided by a corresponding sizing of the at least one orifice 20, i.e. an opening cross section thereof.

Given operational pressure relief, the slope $dF_D/dV_D$ of the force-speed characteristic curve of the damper 11 is then a maximum of 2,500 N-s/m. Starting at the damper speed VD, at which the pressure relief begins, the slope $dF_D/dV_D$ is a maximum of 2,500 Ns/m. This can in particular be ensured by a corresponding stiffness of a spring element of the respective control valve 23, 24 that is providing the pressure relief.

The pressure relief on the control valves 23, 24 operates starting at an effective damper speed of between 0.02 and 0.14 m/s, wherein a force of at least 6,000 N is provided by the respective closed control valve 23, 24. The change from non-operational to operational pressure relief at an effective damper velocity $V_D$ between 0.02 and 0.14 m/s can be in particular ensured by a corresponding preloading of the spring element of the respective control valve 23, 24 that is providing the pressure relief. The force of at least 6,000 N with each closed control valve 23, 24 can be in particular ensured by the stiffness of the spring element that is providing the pressure relief. The force of the damper 11 and/or piston 13 is controllable in the above speed range between 50 N and 6,000 N via an electric current in the control valve 23, 24. The hydraulic pump 16 can withstand or hold a pressure of at least 130 bar. The invention enables the provision of advantageous dynamic and acoustic characteristics of the damping system 10.

The invention further relates to a motor vehicle comprising a damping system 10. Preferably, such a damping system 10 is associated with each wheel of a motor vehicle. It is possible to dampen wheel movements and keep accelerations of a construction of the motor vehicle to a minimum. Efficient operation of the damping system is possible. Active control of the vibration of the construction of the motor vehicle can be ensured.

What is claimed is:

1. A damping system of an active chassis of a motor vehicle for one wheel of the motor vehicle, said damping system comprising:
   a damper including a double-acting hydraulic cylinder and a piston positioned within the hydraulic cylinder, which damper is configured to be coupled to a wheel suspension system for the wheel,
   a hydraulic pump, and
   a hydraulic unit having a hydraulic reservoir and valves,
   wherein the hydraulic pump and the hydraulic unit interact with hydraulic chambers of the hydraulic cylinder such that, movement of the piston in either a first actuation direction or in a second actuation direction depends on a conveying direction of the hydraulic pump,
   wherein the damper is configured such that, in a region of the damper, a flow of hydraulic oil via the piston or along the piston of the damper is at most 3 L/min,
   wherein the damper is configured such that a slope of a force-speed characteristic curve of the damper is between 50,000 and 250,000 N-s/m given non-operational pressure relief.

2. The damping system according to claim 1, wherein the damper comprises at least one orifice having a cross section sized such that the flow of hydraulic oil via the piston or along the piston is at most 3 L/min in both directions of operation of the piston of the damper.

3. The damping system according to claim 2, wherein the at least one orifice is an adjustable orifice whose cross section is adjustable in order to control the flow of hydraulic oil via the piston or along the piston of the damper.

4. The damping system according to claim 1, wherein the hydraulic pump is configured such that a leakage flow in the region of the hydraulic pump is at most 2 L/min in both conveyance directions of the hydraulic pump.

5. The damping system according to claim 1, wherein, for each actuation direction of the piston, the hydraulic unit comprises a control valve with pressure relief, wherein the pressure relief is configured such that, if a speed of the piston of the damper is less than a defined limit value, then the pressure relief is not operational and that, if the speed of the piston of the damper is greater than the defined limit value, then the pressure relief is operational.

6. The damping system according to claim 5, wherein the pressure relief is configured such that, when the control valve is closed, the force of the damper is at least 6,000 N.

7. The damping system according to claim 5, wherein the defined limit value for the speed of the piston of the damper is between 0.02 and 0.14 m/s.

8. The damping system according to claim 5, wherein the force of the damper is controllable between 50 and 6,000 N via an electrical current in the respective control valve.

9. The damping system according to claim 1, wherein, given operational pressure relief, the slope of the force-speed characteristic curve of the damper is at most 2,500 N-s/m.

10. A motor vehicle having multiple wheels, wherein the wheels of each axle are each associated with a damping system according to claim 1.

\* \* \* \* \*